United States Patent
Ulmer

(10) Patent No.: US 10,429,546 B1
(45) Date of Patent: Oct. 1, 2019

(54) WEATHER SENSOR INCLUDING VERTICALLY STACKED MULTI-POWER MODULES

(71) Applicant: Intellisense Systems, Inc., Torrance, CA (US)

(72) Inventor: Christopher T. Ulmer, San Pedro, CA (US)

(73) Assignee: INTELLISENSE SYSTEMS, INC., Torrance, CA (US)

( * ) Notice: Subject to any disclaimer, the term of this patent is extended or adjusted under 35 U.S.C. 154(b) by 329 days.

(21) Appl. No.: 15/390,196

(22) Filed: Dec. 23, 2016

Related U.S. Application Data

(60) Provisional application No. 62/299,836, filed on Feb. 25, 2016.

(51) Int. Cl.
*G01P 5/24* (2006.01)
*G01W 1/02* (2006.01)
*G01P 13/00* (2006.01)

(52) U.S. Cl.
CPC ............... *G01W 1/02* (2013.01); *G01P 5/245* (2013.01); *G01P 13/00* (2013.01)

(58) Field of Classification Search
CPC .......... G01W 1/02; G01P 5/245; G01P 13/00
See application file for complete search history.

(56) References Cited

U.S. PATENT DOCUMENTS

| | | | |
|---|---|---|---|
| 9,075,168 B2 * | 7/2015 | Bertolotti | G01S 15/885 |
| 2010/0140953 A1 * | 6/2010 | Santos | G01F 1/684 |
| | | | 290/55 |

FOREIGN PATENT DOCUMENTS

| | | |
|---|---|---|
| CN | 203217092 | 9/2013 |
| CN | 204331067 | 5/2015 |
| CN | 204855549 | 12/2015 |
| FR | 2800876 | 5/2001 |

OTHER PUBLICATIONS

ISR and Written Opinion dated Apr. 18, 2017 for PCTUS2017017536, 14 pages.

* cited by examiner

*Primary Examiner* — Harshad R Patel
*Assistant Examiner* — Nigel H Plumb
(74) *Attorney, Agent, or Firm* — Sheppard, Mullin, Richter & Hampton LLP

(57) ABSTRACT

An assembly and method for using ultrasonic wind sensors and their assembly with solar cell technology is disclosed. The weather sensor assembly may include a sensor module with a top sensor and a bottom sensor, where the top sensor and the bottom sensor are separated by a gap to allow air to flow through unobstructed. By including an unobstructed gap in the sensor module structure, ultrasonic signals communicated by the ultrasonic wind sensors to obtain wind measurements are less subject to comprise from signal interference, thereby improving accuracy. Additionally, one or more power modules may be included that provide power storage and power generation capabilities, which are then placed beneath the sensor module. By doing so, multiple power modules can be stacked vertically on top of one another to ensure that ultrasonic wind sensors, which typically require high power, are powered more efficiently.

20 Claims, 6 Drawing Sheets

WEATHER SENSOR INCLUDING VERTICALLY STACKED MULTI-POWER MODULES

CROSS-REFERENCE TO RELATED APPLICATIONS

This application claims the benefit and priority to U.S. Provisional Patent Application Ser. No. 62/299,836 filed on Feb. 25, 2016, the contents of which are incorporated herein by its entirety.

This application was made under a contract with an agency of the U.S. Government. The name of the U.S. Government agency and Government contract numbers are: United States Air Force. Contact Numbers: FA8651-14-C-0132 and SOCOM H92222-15-C-0032.

TECHNICAL FIELD

The disclosed technology relates generally to ultrasonic wind sensors, otherwise known as ultrasonic anemometers. More specifically, the disclosed technology relates to the assembly ultrasonic wind sensors powered by solar cell technology.

BACKGROUND

Ultrasonic wind sensing technology utilizes ultrasonic sound waves to measure wind velocity and wind direction. The ultrasonic wind sensors typically utilize two or more ultrasonic transducers to generate and transmit the ultrasonic signals to obtain such wind measurements. Specifically, by monitoring and obtaining the transmitted and received signals from the ultrasonic wind sensors, both wind speed and wind direction measurements may be obtained.

While ultrasonic wind sensing technology is much more accurate than other conventional wind speed measurement devices, one of the current limitations associated with ultrasonic wind sensors is that the transmitted and received signals may be compromised by signal turbulence. This then results in faulty and incorrect measurement data. Additionally, these ultra-sonic wind sensors often require a lot of power to ensure that the specific voltage impulse is properly transmitted to the receiving end of the sensor. As such, there is a need to provide a more accurate sensing system with sufficient power generation and storage capabilities to ensure that these ultrasonic wind sensors are powered effectively and efficiently.

BRIEF SUMMARY OF EMBODIMENTS

According to various embodiments of the disclosed technology, a weather sensor assembly is disclosed. In some embodiments, the weather sensor assembly includes a sensor module. The sensor module may include a top sensor and a bottom sensor, where the top sensor and the bottom sensor are separated by a gap to allow air to flow through unobstructed.

In further embodiments, the weather sensor assembly may further include a power module to power the sensor module. The power module may be stacked beneath the sensor module when more than one power module is provided, so as to provide power storage and power generation capabilities to the sensor module.

Also included are methods for using a weather sensor assembly. The provided method includes obtaining a weather sensor assembly with a sensor module with a top sensor and a bottom sensor. By way of example only, the top side sensor and the bottom sensor may be separated by a gap to allow air to flow in between unobstructed. The weather sensor assembly may also include a power module configured to provide power storage and power generation capabilities to the sensor module. The method may also include stacking one or more power modules vertically underneath the sensor module. The method may further include obtaining measurements from the sensor module to determine at least wind speed and wind direction.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description is not to be taken in a limiting sense, but is made merely for the purpose of describing the general principles of the disclosed embodiments. The present embodiments address the problems described in the background while also addressing other additional problems as will be seen from the following detailed description. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Figure 1:
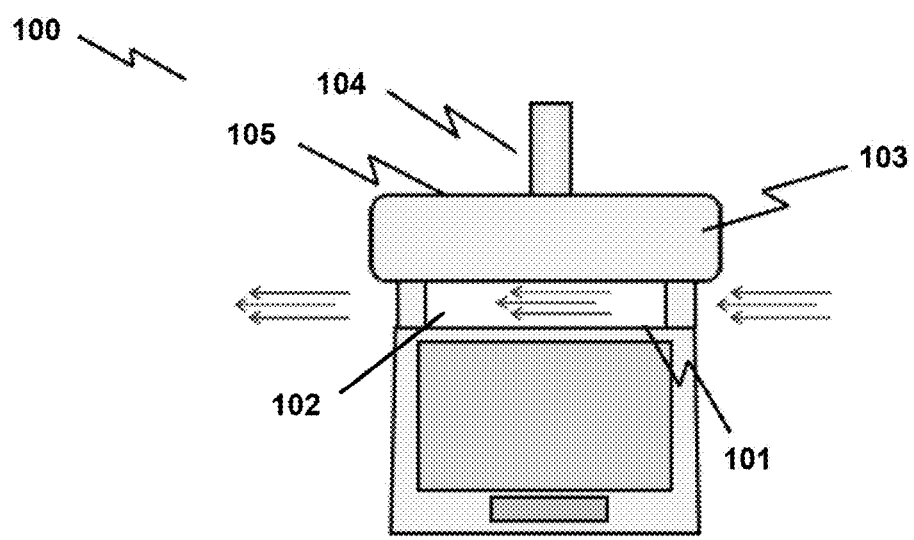
FIG. 1 illustrates a side view of a wind sensor module with an unobstructed air gap according to one particular embodiment.

FIG. 1 illustrates a side view of a wind sensor module 100 with an unobstructed air gap 102 according to one particular embodiment. As illustrated, wind sensor module 100 may include a bottom sensor 101 and a top sensor 103, where a gap 102 is present in between the bottom sensor 101 and the top sensor 103. With the presence of the gap 102, wind is able to flow through so that the wind sensor module 100 is able to then detect the wind blowing through and determine the appropriate wind measurements, such as wind speed and wind direction. Additionally, the gap 102 may be constructed such that the space is devoid of any objects or devices, further ensuring that there will be no signal interference when determining the appropriate wind measurements.

More specifically, the wind sensor module 100 may include a plurality of ultrasonic transducers spaced equally around the surface of the bottom sensor 101. But to ensure that the gap 102 area is unobstructed by any devices or objects, the transducers may lay flat on the surface of the bottom sensor 101. By way of example only, a range from two to six ultrasonic transducers may be equally spaced around the top most surface of the bottom sensor 101. In such an embodiment, each of the transducers may take turns transmitting a signal, in which the remaining transducers may receive and detect the transmitted pulse. In some instances, select transducers may be assigned to only transmit pulsed signals while the remaining others may be assigned to only detect the transmitted pulsed signals. In other instances, each of the transducers may take turns transmitting and receiving pulsed signals.

Located above the bottom sensor 101 and the gap 102 area may be the top sensor 103. The top sensor 103 may include other various sensors or devices that are not transducers. For example, such other sensors may be those that provide measurements for air temperature, barometric pressure, humidity, and the like.

Additionally, in further embodiments, the top surface 105 of the top wind 103 may be configured so that the area is devoid of any sensors to reserve the area for devices that need to be exposed to the environment, such as a wireless transmission antenna 104 by way of example only. However, it should be noted that other equipment or hardware can be included on the top surface 105, such as a camera, GPS, etc.

Figure 2:
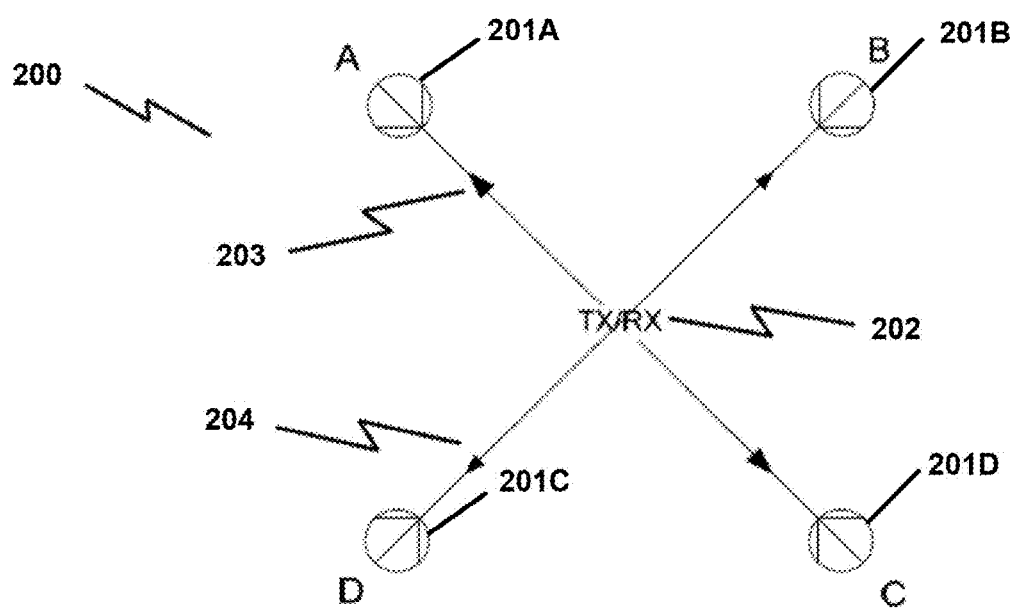
FIG. 2 illustrates a top view of a wind sensor module according to one particular embodiment.

FIG. 2 illustrates a top view of the arrangement of the wind sensor system 200. As illustrated, the wind sensor system 200 includes four individual ultrasonic wind sensors 201 A, B, C, D. Here, there are a plurality of ultrasonic wind sensors 201 A, B, C, D that are equally spaced apart from one another so that they essentially form a ring around the center 202. As illustrated in FIG. 1 with the gap area, the center 202 area here is where the gap area is located. As depicted in FIG. 2, the center 202 area is clear of any obstructions so that air may pass through without any interference.

Each of the ultrasonic wind sensors 201 A, B, C, D may include transmitters so that pulses of sound may be transmitted and detected. In this particular embodiment, the 4 ultrasonic wind sensors 201 A, B, C, D may work in pairs. Thus, with each pair, one of the ultrasonic wind sensor 201 C, D immediately opposite detects the transmitted pulse, and vice versa. The time from which it takes for the signal to be transmitted and detected is then measured through the use of an electronic timer. The time may be logged to determine the average speed of sound, which in turn can be used to estimate air temperature. The overall wind vector may also be determined by using the wind speed along the first axis 203 and the second axis 204 as the two vector components.

While this particular example provides 4 ultrasonic wind sensors 201 A, B, C, D by way of example only, it should be noted that various different number of wind sensors may be utilized. For example, a range of two to six individual ultrasonic wind sensors may be used.

Figure 3:
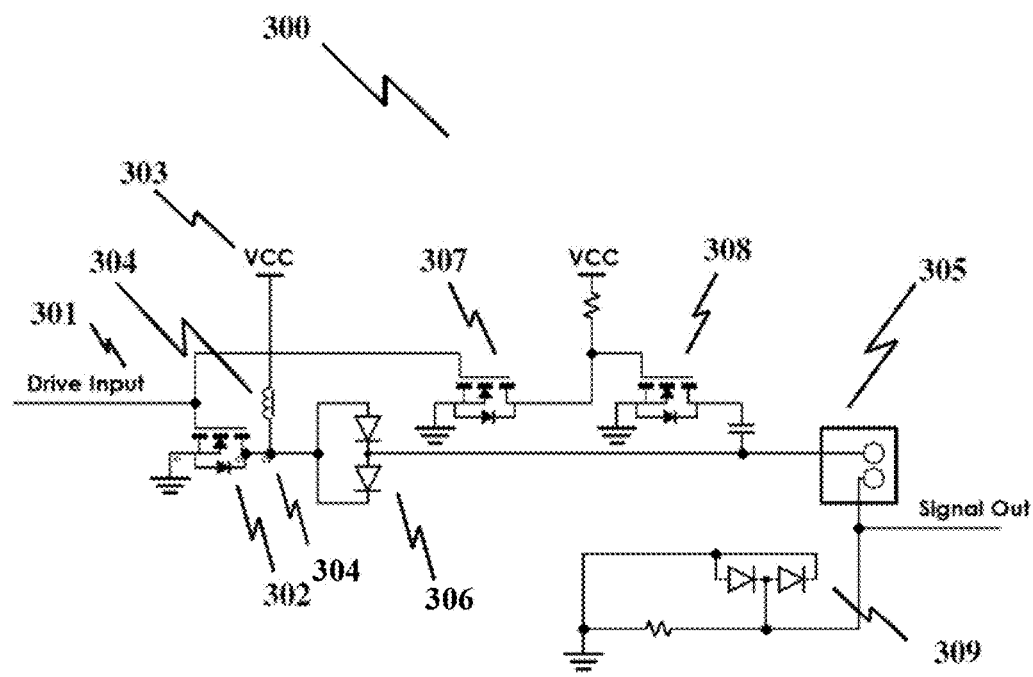
FIG. 3 illustrates a power-optimized electronics design for each of the transducers located within a wind sensor module according to one particular embodiment.

FIG. 3 illustrates a power-optimized electronics design 300 for the individual ultrasonic wind sensors according to one particular embodiment. Because the wind sensor system may often consume a lot of electrical power in order to operate and provide the necessary wind measurements, an efficient and optimal power management source is needed. Here, as illustrated, this power-optimized electronics design 300 utilizes a topology that allows itself to completely avoid the power-intensive generation of the necessary voltage supply to operate the wind sensor system. While this particular example utilizes a 400V supply requirement, it should be noted that any voltage supply requirement needed to power on the wind sensor system may be utilized with this power-optimized electronics design 300.

Here, the power-optimized electronics design 300 uses a drive signal 301 that is used to control the high-voltage MOSFET transistor 302. The high-voltage MOSFET transistor 303 may be connected to the main power supply 303 through a fly-back inductor 304. While the drive signal is logic-high, the transistor is turned on to then cause the current to build in the inductor until the drive signal is turned off. This may cause the inductor voltage to increase rapidly as a result of the rapid drop in current. The voltage in the inductor may then reach 400V momentarily (e.g., 100 nS duration), which then drives the ultrasonic transducer 305 through a pair of diodes 306 that act as an incremental short-circuit for large signals, but then effectively disconnects the transducer after the pulse is over.

A separate circuit may immediately be triggered after the pulse is over by using an inverting topology 307 to drive a separate high-voltage transistor 308 and short the driven side of the sonic transducer when the transducer is not driven. The non-driven side of the sonic transducer may be grounded through two diodes 309 that act an incremental open circuit for large signals, but which also acts as an incremental short circuit for the very small signal that is induced in the transducer during receive mode. In this particular case, the large signals may be characterized as those where the drive signal is 400V, and a very small signal as one that is in the microvolt range, by way of example only. This circuit then allows each transducer to be driven with a 400V impulse during transmit mode while allowing for detection of a few micro-volts during receive or detection mode. As a result, this particular embodiment allows for the ability to generate 400V impulse signal while drawing only 50 microamps for all of the transducers used in the sensor module.

This power optimized electronics design 300 may be implemented into each transducer of the sensor module. However, it should be noted that this power optimized electronics design 300 may be implemented into however many transducers that are available. Thus, sensor module with 2 transducers will have this disclosed power optimized electronics design for those 2 transducers.

Figure 4:
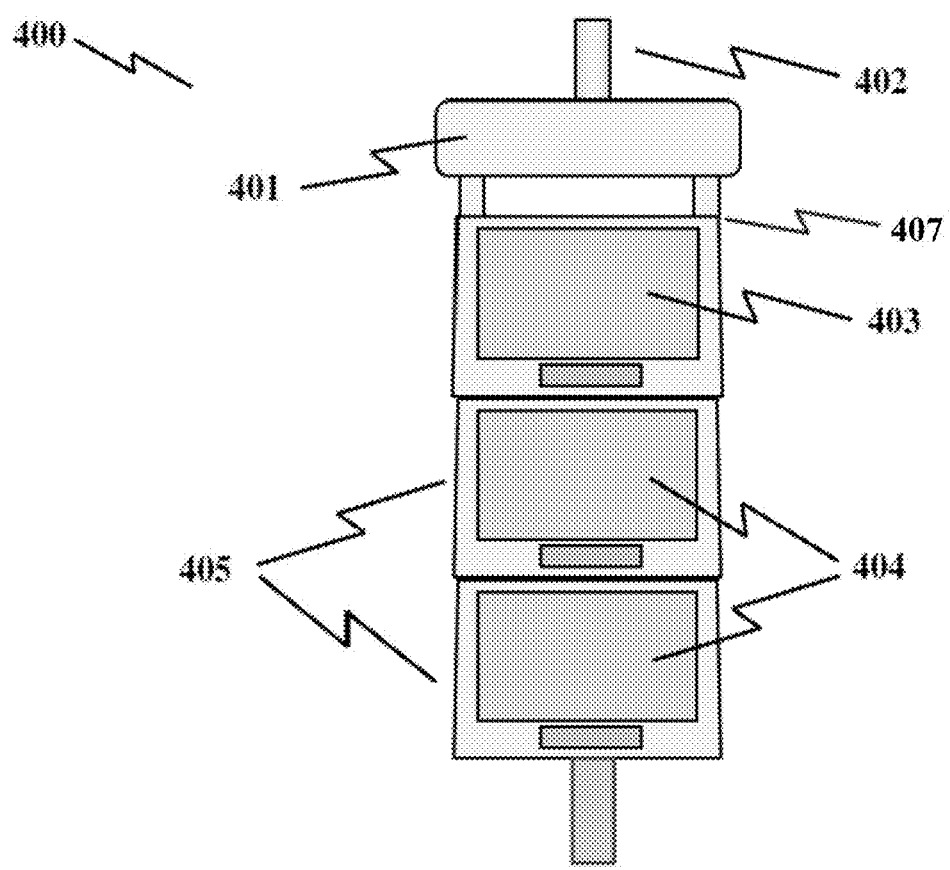
FIG. 4 illustrates a wind sensor assembly with power modules according to one particular embodiment.

FIG. 4 illustrates a wind sensor assembly 400 that includes a sensor module 403 with power modules 405 according to one particular embodiment. Here, the sensor module 403 may be connected to an external power source or power modules 404 to provide power to the various sensors housed and within the sensor module 403, as described above with respect to FIGS. 1 and 2.

In some embodiments, the power modules 405 may be stacked vertically underneath the sensor module 403. The power modules 405 may be configured to provide additional power generation capabilities as well as additional power storage capabilities. By way of example only, the power generation capabilities may be done with the use of solar cells, while the power storage capabilities may be done with the use of batteries. By stacking and incorporating the power modules 405 to be in connection with the sensor module 403, the appropriate power supply may be fed to the top sensor 401 and the bottom sensor 407 of the sensor module 403 as needed. As illustrated, the sensor module 403 remains at the top of the wind sensor assembly 400.

In further embodiments, the power modules 405 may be stacked vertically. By way of example only, the solar cells 404 may be placed at the sides of the power modules 405. By placing the solar cells 404 at the sides of the power modules 405, this allows the power modules 405 to be stacked, thus saving space and allowing the use of more solar cells within a given area.

While it may seem that the solar cells 404 will not receive a sufficient amount of sunlight if they are to be located at the sides of the power module, this is not the case. Indeed, this unexpected result is evidenced after studying and observing the path of the sun across the sky at different latitudes. Indeed, our calculations show that the total accumulated solar exposure is higher when the solar cells 404 are positioned at the sides in a vertical manner when compared to those placed in a horizontal manner, as detailed further below.

More specifically, we observed the the sun's angles throughout the day and then applied a cosine calculation to these angles relative to a normal vector from a solar-energy collecting surface, such as solar cells that are vertically stacked as described in FIG. 4. The application of the cosine was then used to calculate solar energy harvesting efficiency. To compare the difference in energy harvesting efficiency, FIG. 5 illustrates graphical representations that compares solar energy harvesting efficiencies of solar cell on horizontal surface and those located on vertical surfaces.

Figure 5:
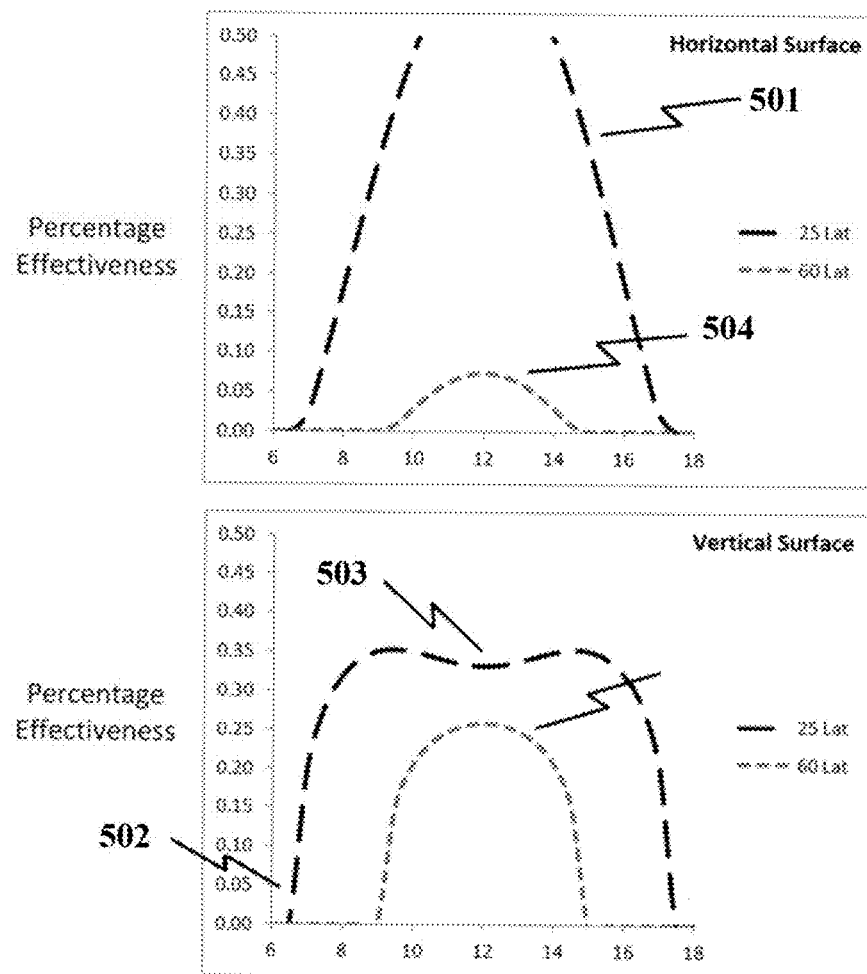
FIG. 5 illustrates graphical representations of the solar energy harvesting efficiencies of solar cells located on horizontal surfaces and those on vertical surfaces.

Here, the top graph of FIG. 5 provides data points for the harvesting efficiencies of solar cells on a horizontal surface while the lower graph provides data points for the harvesting efficiencies of solar cells on a vertical surface. As depicted, at a latitude of 25 degrees North, the solar efficiency level of the horizontal surface reaches a very high peak 501 at noon whereas the vertical surface reaches a much lower peak 502, and even actually experiences a small dip 503 in efficiency during the middle of the day. However, it is clear that the solar cells on the vertical surface experiences a swifter rise in solar efficiency that starts earlier in the day and lasts further in the day 604 when compared to that of the horizontal surface. As a result, the slight dip in efficiency in the vertical surface is offset with the earlier and prolonged harvesting efficiency experienced throughout the day.

As further illustrated in FIG. 5, at a latitude of 60 degrees, the harvesting efficiency of the horizontal surface peaks 504 at no more than 8% while the vertical surface reaches a peak harvesting efficiency of approximately 25%. These graphical comparisons at FIG. 5 show how much more effective vertical surfaces can be at collecting sun energy when compared to horizontal surfaces. Thus, the placement of solar cells on the vertical surface may be much more effective at collecting sun energy than if they were placed on a horizontal surface.

Figure 6:
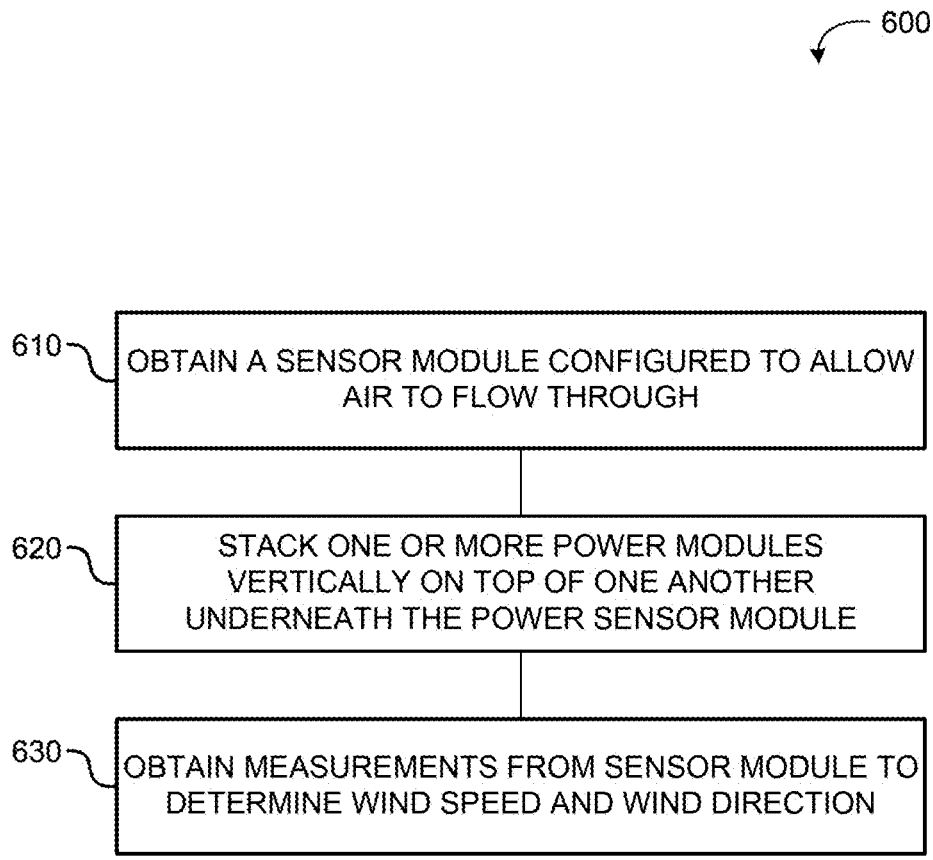
FIG. 6 illustrates a flow chart for using a weather sensor assembly to obtain wind measurements according to one particular embodiment.

FIG. 6 illustrates a flow chart for a method 600 using a weather sensor assembly to obtain wind measurements according to one particular embodiment. The method 600 may include obtaining a weather sensor assembly that includes a sensor module and a power module at step 610. The sensor module may include a top sensor and a bottom sensor, such that the top sensor and the bottom sensor are separated by a gap to allow air to flow through without any hindrance or obstruction. Additionally, the power module may be configured to provide power storage and power generation capabilities to the sensor module.

Next, method 600 at step 620 may include stacking one or more power modules vertically on top of one another underneath the sensor module. In some instances, the power modules may have solar cells attached to the outer sides of the power module, so that the sun rays are collected at the sides of the power module. The collected solar energy may then be stored within the batteries of the power modules, so that the power is then fed to the sensor module when required and needed.

Next, method 600 at step 630 may include obtaining measurements from the sensor module to determine wind speed and wind direction based on the wind measurements. As explained above, the sensor modules may include transduces that transmit and detect for pulses of sound based on the wind that passes by the ultrasonic wind sensors.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A weather sensor assembly comprising:
   a sensor module comprising:
      a top sensor; and
      a bottom sensor comprising one or more transducers to transfer signals for measuring air flow, wherein the top sensor and the bottom sensor are separated by a gap devoid of objects interfering with the transfer of signals and allowing air to flow in between the top sensor and the bottom sensor for the one or more transducers to measure the air flowing through the gap unobstructed to determine at least one of wind speed and wind direction associated with the measured air flow; and
   one or more power modules with power storage and power generation capabilities are placed beneath the sensor module, wherein the power modules are stacked vertically on top of one another to provide power to the sensor module.

2. The weather sensor assembly of claim 1, wherein the one or more power modules comprise a solar cell attached to a side of the one or more power modules.

3. The weather sensor of claim 2, wherein the one or more power modules that are stacked vertically allow the power modules to be establish a linked connection with each other to power the sensor module.

4. The weather sensor assembly of claim 1, wherein the one or more transducers of the bottom sensor comprises one or more ultrasonic transducers to measure the air flowing through the gap between the bottom sensor and the top sensor to determine at least one of wind speed and wind direction.

5. The weather sensor assembly of claim 1, wherein the one or more transducers of the bottom sensor comprises four transducers to measure the air flowing through the gap between the bottom sensor and the top sensor to determine at least one of wind speed and wind direction.

6. The weather sensor assembly of claim 5, wherein the one or more transducers of the bottom sensor comprises a first transducer that transmits a pulse of sound to a second transducer opposite from the first transducer, such that the second transducer detects the pulse of sound.

7. The weather sensor assembly of claim 6, wherein the one or more transducers of the bottom sensor comprises a third transducer that transmits the pulse of sound to a fourth transducer opposite from the first transducer, such that the fourth transducer detects the pulse of sound.

8. The weather sensor assembly of claim 1, wherein the one or more transducers of the bottom sensor comprises three transducers configured where each of the three transducers rotate in transmitting and detecting pulses of sound to determine at least wind speed and wind direction.

9. The weather sensor assembly of claim 1, wherein the top sensor comprises a transmission antenna placed on a top surface of the top sensor.

10. The weather sensor assembly of claim 1, wherein the top sensor comprises sensors or instruments to obtain measurements of at least one of air temperature, barometric pressure, location, and humidity.

11. A method for using a weather sensor assembly comprising:
    obtaining a weather sensor assembly comprising:
       a sensor module comprising:
          a top sensor; and
          a bottom sensor comprising one or more transducers to transfer signals for measuring air flow, wherein the top sensor and the bottom sensor are separated by a gap devoid of objects interfering with the transfer of signals and allowing air to flow between the top sensor and the bottom sensor for the one or more transducers to measure the air flowing through the gap unobstructed to determine at least one of wind speed and wind direction associated with air flow; and
       a power module configured to provide power storage and power generation capabilities to the sensor module;
    stacking one or more power modules vertically underneath the sensor module; and
    obtaining measurements from the sensor module to determine at least wind speed and wind direction.

12. The method for using the wind sensor assembly of claim 11, further comprising placing solar cells on sides of the power modules to provide additional power generation capabilities to the weather sensor.

13. The method of using a wind sensor assembly of claim 11, wherein the one or more transducers of the bottom sensor comprises four transducers to measure air flowing through the gap between the bottom sensor and the top sensor.

14. The method of using a wind sensor assembly of claim 13, further comprising transmitting pulses of sound from a first transducer to a second transducer located opposite from the first transducer.

15. The method of using a wind sensor assembly of claim 14, further comprising transmitting pulses of sound from a third transducer to a fourth transducer located opposite from the third transducer.

16. The method of using a wind sensor assembly of claim 15, further comprising having the second transducer and the fourth transducer detect the pulses of sound from the first transducer and the third transducer respectively.

17. The method of using a wind sensor assembly of claim 11, further comprising utilizing three transducers to measure the air flowing through the gap between the bottom sensor and the top sensor.

18. The method of using a wind sensor assembly of claim 17, wherein the three transducers are configured so that each rotate in transmitting and detecting pulses of sound to determine at least wind speed and wind direction.

19. The method of using a wind sensor assembly of claim 11, further comprising placing a transmission antenna on a top surface of the top sensor.

20. The method of using a wind sensor assembly of claim 11, wherein the top sensor comprises sensors or instruments to obtain measurements of at least one of air temperature, barometric pressure, location, and humidity.

* * * * *